(12) United States Patent
Subramanian et al.

(10) Patent No.: US 12,508,987 B2
(45) Date of Patent: Dec. 30, 2025

(54) SYSTEM AND METHOD FOR PROVIDING INFORMATION RELATIVE TO A CONNECTION BETWEEN A VEHICLE AND AT LEAST ONE TRAILER

(71) Applicant: Volvo Truck Corporation, Gothenburg (SE)

(72) Inventors: Chidambaram Subramanian, Durham, NC (US); Gabriel Einstoss, Whitsett, NC (US)

(73) Assignee: Volvo Truck Corporation, Gothenburg (SE)

( * ) Notice: Subject to any disclaimer, the term of this patent is extended or adjusted under 35 U.S.C. 154(b) by 70 days.

(21) Appl. No.: 18/591,287

(22) Filed: Feb. 29, 2024

(65) Prior Publication Data
US 2025/0276638 A1    Sep. 4, 2025

(51) Int. Cl.
*B60D 1/28* (2006.01)
*B60Q 9/00* (2006.01)
*H04B 3/54* (2006.01)

(52) U.S. Cl.
CPC ........ *B60Q 9/00* (2013.01); *H04B 3/54* (2013.01)

(58) Field of Classification Search
CPC ..... B60W 2420/403; B60W 2420/408; B60W 60/001; B60W 2552/53; B60W 10/18; B60W 10/20; B60W 2510/18; B60W 2520/10; B60W 2520/105; B60W 2520/12; B60W 2520/125; B60W 2520/14; B60W 2530/201; B60W 2552/05; B60W 2552/45; B60W 2554/402; B60W 2554/4029; B60W 2554/4041; B60W 2554/4042; B60W 2554/4043; B60W 2554/4044; B60W 2554/4045; B60W 2554/80; B60W 2554/801; B60W 2554/806; B60W 2555/60; B60W 2720/10; B60W 2754/20; B60W 2754/30; B60W 30/09; B60W 30/0953; B60W 30/0956; B60W 30/181; B60W 30/18163; B60W 40/02;
(Continued)

(56) References Cited

U.S. PATENT DOCUMENTS

2007/0268964 A1* 11/2007 Zhao ............... H04N 19/53
                                                  375/240.1
2009/0149770 A1*  6/2009 Sing ................. A61B 5/18
                                                  600/544
(Continued)

*Primary Examiner* — Daniel Previl
(74) *Attorney, Agent, or Firm* — Withrow & Terranova, PLLC

(57) ABSTRACT

A system and method for providing information relative to a connection between a vehicle and at least one trailer. The system comprises a power line communication configured to communicate raw signals on at least one electric power conductor between the or each trailer and the vehicle, the system further comprising a user interface unit and a processing unit, the processing unit being configured to apply signal processing to a raw signal received, to obtain a time domain signal, and transform the time domain signal to a frequency domain signal, use the time domain signal and the frequency domain signal in one or more machine learning models, wherein each machine learning model was previously trained to output an information relative to a connection between the vehicle and the or each trailer, and provide the information to the user interface unit.

20 Claims, 5 Drawing Sheets

(58) Field of Classification Search
CPC .............. B60W 40/105; B60W 40/107; B60W 60/0015; B60W 60/0016; B60W 60/0017; B60W 2556/45; B60W 2050/0052; B60W 2050/0075; B60W 2050/0083; B60W 2050/143; B60W 2050/146; B60W 2540/043; B60W 2540/047; B60W 2540/215; B60W 2540/22; B60W 2540/221; B60W 2540/223; B60W 2540/30; B60W 2554/404; B60W 2554/4046; B60W 2555/20; B60W 2556/35; B60W 2556/50; B60W 2556/65; B60W 30/182; B60W 40/04; B60W 40/09; B60W 50/00; B60W 50/0097; B60W 50/0098; B60W 50/14; B60W 50/16; B60W 60/0011; B60W 60/0013; B60W 60/00274; B60W 60/0053; B60W 60/0057; G06V 20/58; G06V 2201/07; G06V 20/584; G06V 40/10; G06V 10/7715; G06V 10/776; G06V 20/00; G06V 20/56; G06V 20/62; G06V 30/10; G06V 30/1429; G06V 30/1448; G06V 30/19173; G06V 30/2253; G06V 40/25; G06V 40/28; G06V 10/00; G06V 30/00; G06V 40/00; G06V 2201/00; G06T 7/20; G06T 2207/30196; G06T 2207/30261; G06T 7/70; G06T 2207/30204; G06T 2207/30244; G06T 3/02; G06T 3/4046; G06T 3/4053; G06T 5/80; G06T 7/248; G06T 7/536; G06T 7/73; G06T 7/74; G06T 2207/20081; G06T 2207/20084; G06T 1/20; G06T 11/40; G06T 15/005; G06T 15/06; G06T 5/70; G06T 1/0007; G06T 2207/30108; G06T 7/0004; G06T 9/00; G01S 13/931; G01S 2013/9323; G01S 13/003; G01S 13/04; G01S 13/56; G01S 7/006; G01S 7/412; G01S 7/415; G01S 7/417; G05D 1/0214; G05D 1/0231; G05D 1/0246; G05D 1/247; G05D 1/249; G05D 1/617; G05D 1/0038; G05D 1/0061; G05D 1/0282; G06N 3/0464; G06N 3/063; G06N 3/09; G06N 3/045; G06N 3/08; G06N 3/044; G06N 3/047; G06N 3/048; G06N 3/088; G06N 3/04; G06N 20/00; G06N 3/006; G06N 3/049; G06N 7/01; G06K 7/10722; G06K 7/1413; G06K 7/1417; H04N 23/45; H04N 23/90; H04W 24/08; H04W 24/06; H04W 84/12; H04W 84/18; H04W 16/18; H04W 24/02; H04W 4/40; H04W 4/46; B60R 2325/101; B60R 2325/106; B60R 25/31; G01G 19/086; G01G 19/024; G01G 3/125; B60Q 9/00; B60T 8/1708; B60T 8/1766; B60T 8/1887; B60T 8/30; B61L 23/041; B61L 25/021; B61L 25/023; B61L 25/028; B61L 25/04; B61L 27/57; G01C 21/3415; G01C 21/3461; G01C 21/3822; G01C 21/3837; G06F 16/9538; G06F 16/9577; G06F 17/00; G06F 18/21; G06Q 10/04; G06Q 10/087; G06Q 30/0201; G06Q 30/0251; G06Q 30/0282; G06Q 50/40; G08G 1/0112; G08G 1/0116; G08G 1/0129; G08G 1/0141; G08G 1/09626; G08G 1/096725; G08G 1/096741; G08G 1/09675; G08G 1/096758; G08G 1/096775; G08G 1/096783; G08G 1/162; G08G 1/163; G08G 1/166; G08G 1/167; H04B 3/54; H04L 9/3213
USPC ....... 340/431, 432, 433, 434, 435, 438, 441, 340/477, 488, 516, 538.12, 527, 538.11, 340/534

See application file for complete search history.

(56) References Cited

U.S. PATENT DOCUMENTS

| | | | |
|---|---|---|---|
| 2012/0330597 A1* | 12/2012 | Lammers | B60R 16/03 702/122 |
| 2017/0240125 A1* | 8/2017 | Weigert | B60R 16/023 |
| 2020/0252412 A1* | 8/2020 | Prasad Koppisetti | G06N 3/08 |
| 2024/0359510 A1* | 10/2024 | Richardson | B60C 23/0039 |

* cited by examiner

SYSTEM AND METHOD FOR PROVIDING INFORMATION RELATIVE TO A CONNECTION BETWEEN A VEHICLE AND AT LEAST ONE TRAILER

TECHNICAL FIELD

The disclosure relates generally to power line communication for vehicle-trailer communication. In particular aspects, the disclosure relates to a system for providing one or more information between a vehicle and one or several trailer(s). The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Power line communication (PLC) is used in certain geographical regions on heavy-duty vehicles for trailer-vehicle communication in articulated vehicles. PLC uses electric cables and electric signals to communicate information between entities connected to the electric cable.

In the currently applied solutions, an electronic control unit (ECU) of the trailer transmits a PLC signal on an electric power line connecting to the vehicle to indicate the status of the trailer. In particular, the trailer ECU is configured to send a signal for indicating a trailer antilock braking system (ABS) malfunction via PLC, the signal being processed by a specific hardware unit containing a transreceiver, signal conditioner, and/or a host interface, e.g. a P485 chip, for powering a warning indicator, such as a warning lamp, to indicate the trailer ABS malfunction.

Since the P485 chip is a hardware component, it may appear useful, in particular in order to improve safety, to add further redundancy in the detection of signals relating to the trailer ABS malfunction communicated via PLC. Furthermore, it is desirable to improve the detection of signals transmitted via PLC also in the case where a vehicle has more than one trailer.

SUMMARY

According to a first aspect, the disclosure concerns a system for providing information relative to a connection between a vehicle and at least one trailer, the system comprising a power line communication configured to communicate raw signals on at least one electric power conductor between the or each trailer and the vehicle, the system further comprising a user interface unit and a processing unit, the processing unit being configured to: apply signal processing to a raw signal received, to obtain a time domain signal, and transform the time domain signal to a frequency domain signal, use the time domain signal and the frequency domain signal in one or more machine learning models, and provide the information to the user interface unit.

The first aspect of the disclosure may seek to improve detection of information communicated via PLC between the trailer or trailers and the vehicle. A technical benefit may include not relying simply of the hardware chip for detecting the ABS malfunction of a trailer, and therefore improving the overall vehicle-trailer control.

Optionally in some examples, including in at least one preferred example, the transform comprises applying a Fourier Transform on the time domain signal to obtain the frequency domain signal. A technical benefit may include obtaining, in a computationally efficient manner, a frequency domain signal representative of the raw signal communicated over the PLC.

Optionally in some examples, including in at least one preferred example, the transform comprises applying a Welch power spectral density estimation on the time domain signal to obtain the frequency domain signal. A technical benefit may include removing noise in the spectrum and providing more clarity to the signal and data of interest with respect to the number of trailers and PLC messages.

Optionally in some examples, including in at least one preferred example, the information comprises a first information indicating, for the or each trailer, whether said trailer is connected or not to the vehicle. A technical benefit may include determining whether a trailer is connected to the vehicle via software processing of signals communicated via the power line communication. Indeed, in practical applications various types of vehicle-trailers are encountered, for example a trailer with refrigerator units, a trailer with all LED lights, a trailer with lights with high power consumption, and the different types of trailers provide different signal values. Therefore, simple software-based prediction solutions are not applicable. Advantageously, the use of machine learning models allows the processing of signal diversity to determining whether a trailer is connected to the vehicle. Optionally in some examples, including in at least one preferred example, the information comprises a second information indicating a number of trailers connected to the vehicle. A technical benefit may include determining, via software processing, the number of trailers connected to the vehicle.

Optionally in some examples, including in at least one preferred example, the or each trailer comprises an antilock braking system unit configured to send messages to the vehicle over the power line communication, and the information comprises a third information indicating, for the or each of the trailers connected to the vehicle, whether the trailer antilock braking system unit is sending a message to the vehicle. A technical benefit may include detecting messages from the ABS unit from each trailer, via software processing of signals communicated via the power line communication, therefore not relying only on the hardware chip for detecting the ABS malfunction of a trailer.

Optionally in some examples, including in at least one preferred example, the processing unit is onboard the vehicle. A technical benefit may include providing the information to a vehicle operator very rapidly.

Optionally in some examples, including in at least one preferred example, the vehicle comprises a wireless communication unit adapted to communicate with a wireless communication unit of a distant server, and the processing unit is on said server. A technical benefit may include providing the information via the wireless communication, while also providing the information to operators of the distant server, for example operators monitoring a fleet of vehicles.

Optionally in some examples, including in at least one preferred example, the user-interface unit is situated in the vehicle and comprises a display visible by an operator of the vehicle. A technical benefit may include informing the operator, for example the vehicle driver, of the information related to the or each trailer.

Optionally in some examples, including in at least one preferred example, the or each trailer comprises an antilock braking system unit configured to send messages to the vehicle over the power line communication, the system further comprising a chip dedicated to detecting messages transmitted by over the power line communication. A technical benefit may include improving safety, thanks to the redundant use of both a hardware chip and a software signal processing to detect messages from an ABS unit and number of trailers. In instances, where a hardware chip could fail such as thermal, shock events, etc. Such failure on vehicle, especially autonomous vehicles may create a downtime and risk on safety since there may not be back-up solution for the ABS status information. This may cause such towed vehicles to over brake or under-brake, wheel locking the trailer at an unstable region. Thus, the back-up solution not only enhances uptime but also ensures the vehicle along with the trailer(s) is operated safely. Additionally, the performance of hardware and signal processing may complement each other by one acting as primary system when the other system has challenging conditions. For example, the hardware chip-based system can be good at certain operational conditions and the signal processing based on AI is efficient at other operational conditions where there is enormous data thereby complementing each other in terms of redundancy to maintain peak performance over wide operational conditions.

According to a second aspect, the disclosure concerns a method for providing information relative to a connection between a vehicle and at least one trailer, implement on a system comprising a power line communication configured to communicate raw signals on at least one electric power conductor between the or each trailer and the vehicle, the system further comprising a user interface unit and a processing unit, the method being implemented by the processing unit and comprising, applying signal processing to a raw signal received, to obtain a time domain signal and transforming the time-domain signal to a frequency domain signal, using the time domain signal and the frequency domain signal in one or more machine learning models, wherein each machine learning model was previously trained to output an information relative to a connection between the vehicle and the or each trailer, and providing the information to the user interface unit.

The second aspect of the disclosure may seek to improve detection of information communicated via PLC between the trailer or trailers and the vehicle. A technical benefit may include not relying simply of the hardware chip for detecting the ABS malfunction of a trailer, and therefore improving the overall vehicle-trailer control.

Optionally in some examples, including in at least one preferred example, the transforming of a time domain signal to a frequency domain signal comprises applying a Fourier Transform on the time domain signal to obtain the frequency domain signal. A technical benefit may include obtaining, in a computationally efficient manner, a frequency domain signal representative of the raw signal communicated over the PLC.

Optionally in some examples, including in at least one preferred example, the transforming of a time domain signal to a frequency domain signal comprises applying a Welch power spectral density estimation on the time domain signal to obtain the frequency domain signal. A technical benefit may include removing noise in the spectrum and providing more clarity to the signal and data of interest with respect to the number of trailers and PLC messages.

Optionally in some examples, including in at least one preferred example, the information comprises a first information indicating, for the or each trailer, whether said trailer is connected or not to the vehicle. A technical benefit may include determining whether a trailer is connected to the vehicle via software processing of signals communicated via the power line communication.

Optionally in some examples, including in at least one preferred example, a first machine learning model is used to obtain said first information, the first machine learning model being comprised in a group comprising {Logistic regression, K-Nearest Neighbours, Support Vector Machines, Decision Tree, Random Forest, Naïve Bayes, Convolution Neural Network}. A technical benefit may include using efficient machine learning models.

Optionally in some examples, including in at least one preferred example, the information comprises a second information indicating a number of trailers connected to the vehicle. A technical benefit may include, via software processing, the number of trailers connected to the vehicle.

Optionally in some examples, including in at least one preferred example, a second machine learning model is used to obtain said second information, the second machine learning model being comprised in a group comprising {Linear regression, Ridge regression, Neural Network regression, Lasso regression, Decision Tree regression, Random Forest, K-Nearest Neighbours, Support Vector Machines, Gaussian Regression, Polynomial Regression, Convolutional Neural Network}.

Optionally in some examples, including in at least one preferred example, the information comprises a third information indicating, for the or each of the trailers connected to the vehicle, whether the trailer antilock braking system unit is sending a message to the vehicle. A technical benefit may include detecting messages from the ABS unit from each trailer, via software processing of signals communicated via the power line communication, therefore not relying only on the hardware chip for detecting the ABS malfunction of a trailer.

Optionally in some examples, including in at least one preferred example, a third machine learning model is used to obtain said third information, the third machine learning model being comprised in a group comprising Logistic regression, K-Nearest Neighbours, Support Vector Machines, Decision Tree, Random Forest, Naïve Bayes, Convolutional Neural Network}. A technical benefit may include using efficient machine learning models.

Optionally in some examples, including in at least one preferred example, the method comprises using a first machine learning model to obtain a first information indicating, for the or each trailer, whether said trailer is connected or not to the vehicle, a second machine learning model to obtain a second information indicating a number of trailers connected to the vehicle and a third machine learning model to obtain a third information a third information indicating, for the or each of the trailers connected to the vehicle, whether a trailer antilock braking system unit is sending a message to the vehicle, each of the first, second and third machine learning models being distinct and individually trained to obtain said first, second and third information. A technical benefit may include to ensure secure detection of messages sent by ABS units of each of the trailers and safely detecting any malfunction of a trailer ABS unit.

Optionally in some examples, including in at least one preferred example, the method comprises using a first machine learning model to obtain a first information indicating, for the or each trailer, whether said trailer is connected or not to the vehicle, and if the first information indicates that at least one trailer is connected to the vehicle, use a second machine learning model to obtain a second information indicating a number of trailers connected to the vehicle and/or a third machine learning model to obtain a third information a third information indicating, for the or each of the trailers connected to the vehicle, whether a trailer antilock braking system unit is sending a message to the vehicle, each of the first, second and/or third machine learning models being distinct and individually trained to obtain said first, second and third information. A technical benefit may include to ensure secure detection of messages sent by ABS units of each of the trailers and safely detect any malfunction of a trailer ABS unit.

There are also disclosed herein computer systems, control units, code modules, computer-implemented methods, computer readable media, and computer program products associated with the above discussed technical benefits.

In particular the disclosure concerns a computer program product comprising program code for performing, when executed by the processing circuitry, the method for providing information relative to a connection between a vehicle and at least one trailer as briefly described above.

The disclosure also concerns a non-transitory computer-readable storage medium comprising instructions, which when executed by the processing circuitry, cause the processing circuitry to perform a method for providing information relative to a connection between a vehicle and at least one trailer as briefly described above.

The disclosure also concerns a vehicle-trailer(s) set comprising a system for providing information relative to a connection between a vehicle and at least one trailer as briefly described above.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

This disclosure describes systems and methods for providing information between a vehicle and at least one trailer, and in particular information for detecting the ABS malfunction of a trailer.

Figure 1:
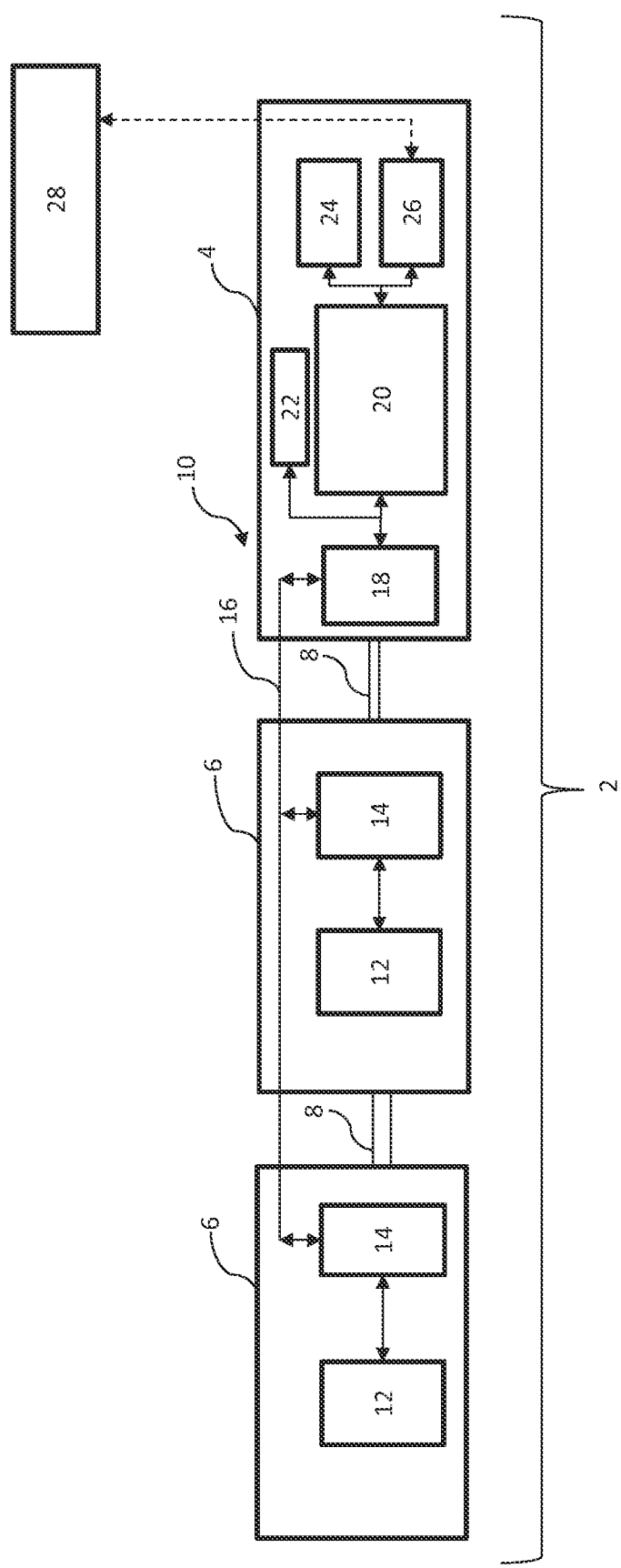
FIG. 1 is an exemplary diagram of a system for providing information between a vehicle and at least one trailer, according to an example.

FIG. 1 represents schematically a vehicle-trailer system 2, which may also be called an articulated vehicle, comprising, in the example, one vehicle 4 which is a towing vehicle configured to tract two trailers 6. The number of trailers 6 may be comprised between one and five.

The vehicle 4 is mechanically coupled to a trailer 6, in turn mechanically connected to a next trailer 6. The mechanical connections 8 are represented schematically.

Furthermore, FIG. 1 represents schematically an example of a system 10 for providing information between the vehicle 4 and at least one trailer 6.

The system 10 for providing information between the vehicle 4 and at least one trailer 6 comprises a Power Line Communication (PLC) system, comprising an electric power conductor and interfacing units as described below.

In the illustrated example, each trailer 6 includes an electronic controller unit 12, which is, according to a preferred example, an antilock braking system (ABS) unit 12. In this case, the ABS unit 12 is configured to monitor a status of the ABS of the trailer 6, in particular to monitor a malfunction of the ABS of the trailer.

According to variants, the electronic controller unit 12 may be a BFDN (Brake Force distribution) unit or a CFC (Coupling Force Control) unit.

The electronic controller unit 12 is connected to or comprises a trailer PLC interface 14, electrically connected to a power conductor 16, the trailer PLC interface 14 being configured to encode/decode information according to PLC communication protocol, the power conductor 16 being configured to carry electric power and electric signals carrying information according to PLC communication protocol.

The vehicle 4 comprises a vehicle PLC interface 18, which can be a first communication interface, electrically connected to the power conductor 16 and configured to encode/decode information according to PLC communication protocol. The vehicle PLC interface unit 18 is included in or connected to an electronic processing device 20, an example of which is detailed with respect to FIG. 2.

According to variants, the vehicle 4 may also comprise a hardware chip 22, connected to the vehicle PLC interface 18, dedicated to detecting signals transmitted over the power line communication. For example, the hardware chip 22 is a P485 chip used to detect a signal transmitted from the ABS unit 12. In this case, the detection of signals transmitted over the power line communication is redundant, and the detection of the ABS malfunction of the trailer is improved.

The vehicle further comprises, connected to the electronic processing device 20, a user interface unit 24 configured to provide information to a user of the vehicle, e.g. the vehicle operator.

For example, according to a variant, the user interface unit comprises one or several visual indicators, such as LED indicators, which is turned on with a predetermined color to indicate a malfunction of the ABS unit. According to variants, the light may be blinked. According to variants, the user interface unit may also comprise a speaker that emits audible sounds, such as buzzes, or speaks a message. According to variants, the user interface unit may also control a haptic feedback in the vehicle, for example vibrates the steering wheel to inform the operator of a malfunction in one or several of the trailer. The cited variants may clearly be combined.

The vehicle may further comprise, a second communication interface 26, configured to communicate according to a wireless communication protocol with external devices, each external device being configured to communicate according to said wireless protocol. The second communication interface 26 may be connected to the processing device 20 or included in the processing device 20. For example, the wireless communication protocol is WiFi protocol, or a cellular network protocol such as 4G or 5G.

According to an example, the second communication interface 26 is configured to communicate with an external server 28, for example a server of a centralized control station.

Figure 2:
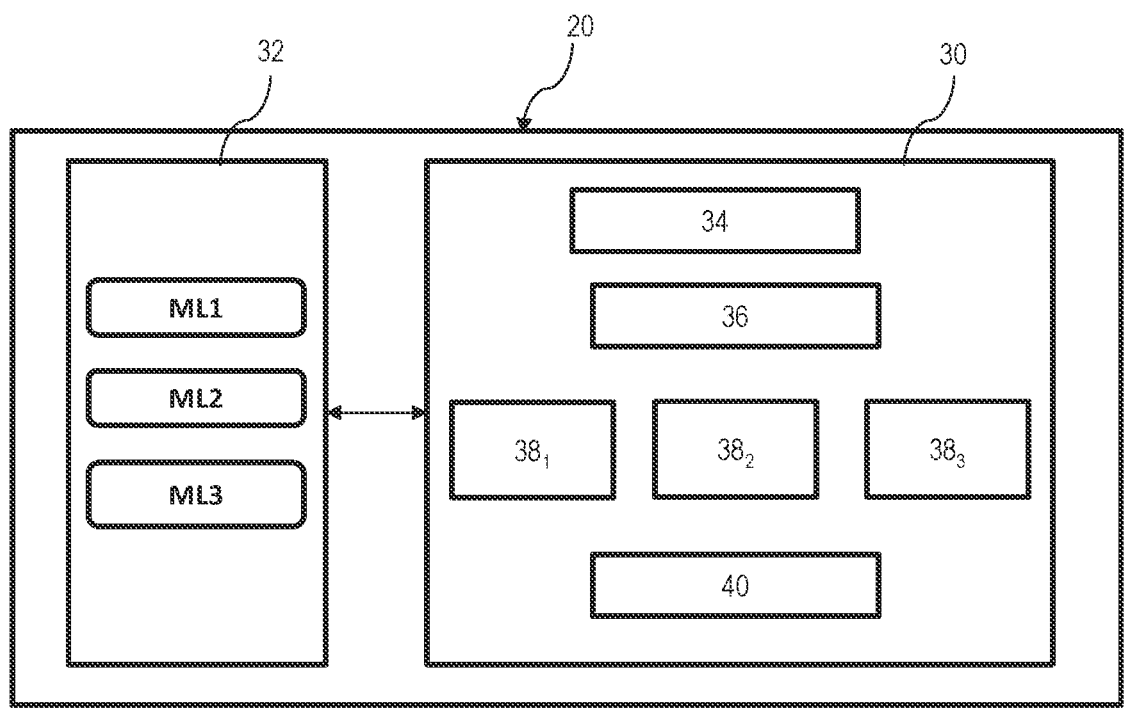
FIG. 2 is an exemplary electronic computing device system comprising a processing unit according to an example.

FIG. 2 is a schematic diagram of an exemplary electronic processing device 20. The electronic processing device may be in the vehicle 4 as described above in reference to FIG. 1. According to variants, the electronic processing device may be an external server 28 as described above.

The electronic processing device 20 comprises a processing unit 30, e.g. a processor, a CPU, and an electronic memory unit 32, configured to communicate via an internal communication bus.

The processing unit 30 comprises circuitry configured to implement a receptor module 34 receiving raw signals via the PLC, a signal processing module 36, applying signal processing to a raw signal received, to obtain a time domain signal, and transforming the time domain signal to a frequency domain signal, one or more information providing modules 381, 382, 383, which may be referred to as information providing modules 38, each module 38 using the time domain signal and the frequency domain signal in one or more machine learning models; each machine learning model being trained to output an information relative to a connection between the vehicle and the or each trailer, and a module 40 providing the information obtained to the user interface unit 24.

Each trained machine learning model ML is stored in the electronic memory unit 32.

Each module 34, 36, 38, 40 may be implemented as software code, and cooperate to achieve a computer program, including software instructions which, when executed by a programmable electronic device or the processing unit 30, implement a method for providing information relative to a connection between a vehicle and at least one trailer.

Preferably, the modules 34, 36, 38, 40 are memorized on a non-transitory storage device readable by a processing system, for example a non-transitory storage of a server system, such as a random-access memory (RAM), read only memory (ROM), remote access hardware drive (conventional hard drive or cloud storage) accessible through direct connection, wired or wireless or a combination thereof.

According to a variant, each of the modules 34, 36, 38, 40 is implemented in the form of a programmable logic component, such as a Field Programmable Gate Array (FPGA), a general-purpose graphics processing unit (GPGPU), or a dedicated integrated circuit such as an application specific integrated circuit (ASIC).

In the illustrated example, three information providing modules 38, respectively referenced 381, 382 and 383 are executed, each using respectively a previously trained machine-learning model ML1, ML2, ML3. For example, the first machine-learning model ML1 provides a first information indicating, for the or each trailer, whether said trailer is connected (referring to the electrical connection) or not to the vehicle; the second machine-learning model ML2 provides a second information indicating a number of trailers connected to the vehicle; the third machine-learning model ML3 provides a third information indicating, for the or each of the trailers connected to the vehicle, whether the trailer antilock braking system unit is sending a message to the vehicle.

Each of the machine learning models is trained to obtain an information of give type. The machine learning models used include Decision trees, Support Vector Machines (SVM), Ensemble Learning, Convolutional Neural Networks, Deep Convolution Neural Networks and Recurrent Neural Networks.

Each machine learning model is trained using a computer system or a plurality of interconnected computers, based on large amounts of test data. The test data comprises raw signals from PLC communication between trailers and vehicles, each raw signal being processed to obtain a corresponding time domain signal, the time domain signal being transformed to a corresponding frequency domain signal, and the corresponding information, also called truth label, is collected on the field.

Each machine-learning model has a given architecture, and is described by a number of parameters, the values of which are learned during the training phase, on the test data. According to an example, basic machine learning is applied. According to a variant, reinforcement learning is applied.

For each machine-learning models, the parameter values learned during the learning phase are then stored in an electronic memory unit 32. The stored machine-learning models are further applied during operational phases to provide information relative to the connection between the vehicle and at least one trailer.

Figure 3:
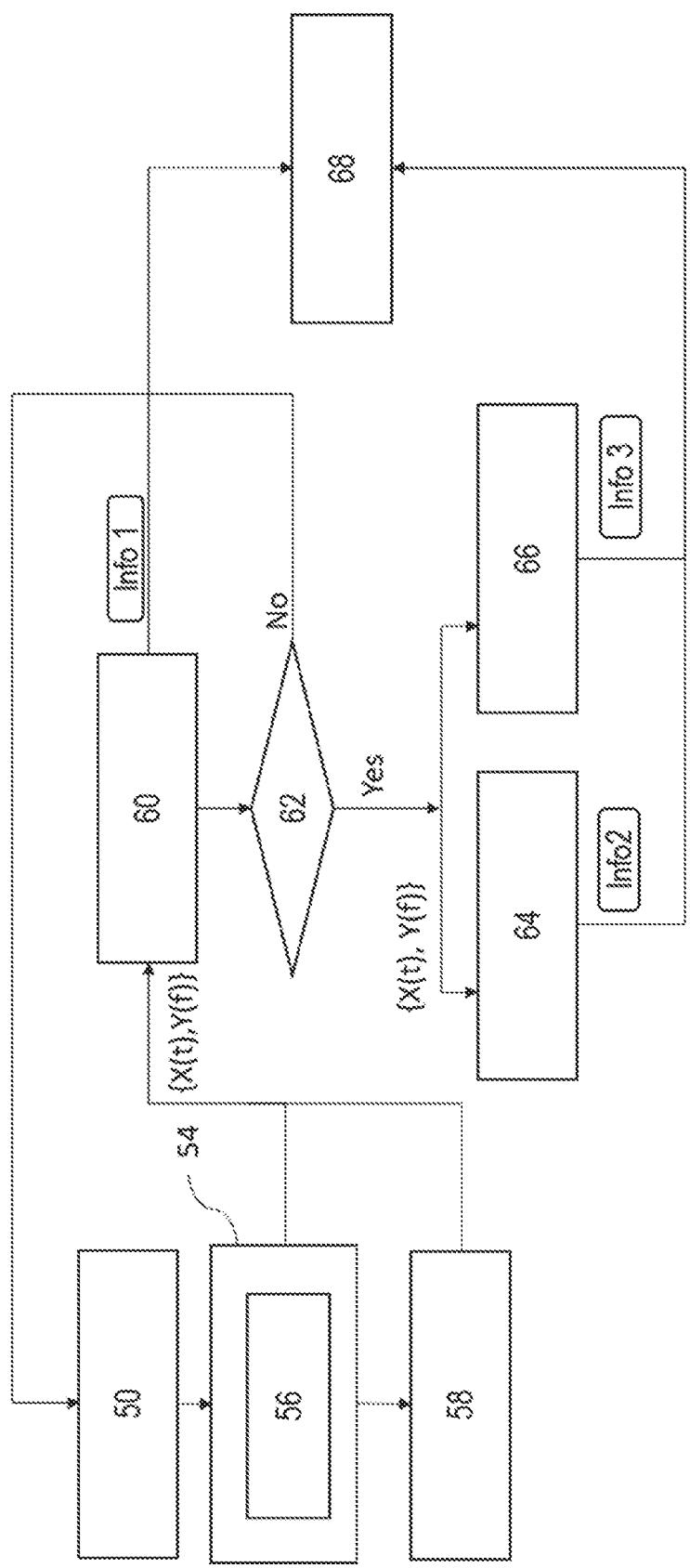
FIG. 3 is an exemplary flowchart of a method for providing information between a vehicle and at least one trailer, according to an example.

FIG. 3 is a flowchart of a method for providing information relative to a connection between a vehicle and at least one trailer according to an example.

The method comprises receiving 50 raw signals via the power line communication system. Each raw signal is an electrical signal, for example a voltage signal.

A signal processing 54 is applied to obtain a time-domain signal X(t) from the raw signal. The signal processing step may comprise a cleaning 56 which may include filtering to remove noise or any type of detected anomalies.

The method also comprises transforming 58 the time domain signal X(t) into a corresponding frequency domain signal Y(f). Each of the time domain signal X(t) and the frequency domain signal Y(f) is a digital signal composed of a given number N of samples.

According to a first variant, the transforming 58 comprises applying a Fast Fourier Transform (FFT) to the time domain signal to obtain a frequency domain signal. Advantageously, the FFT is efficiently implemented using dedicated circuitry, therefore the transformation is very fast, and uses limited computational resources.

According to a second variant, the transforming 58 comprises applying Welch power spectral density estimation. In an exemplary implementation, a dedicated function from a computational library, e.g. PWELCH function may be used.

According to another variant, the transforming 58 applies both Fast Fourier Transform (FFT) and Welch power spectral density estimation to the time domain signal. According to this variant, for each time domain signal, several corresponding frequency domain signals are obtained.

The method further comprises using the time domain signal X(t) and the corresponding frequency domain signal Y(f) as input to a first machine learning model, for applying 60 the first machine learning model to obtain a first information indicating, for the or each trailer, whether said trailer is connected or not to the vehicle. As already explained, the first machine learning model was previously trained, on test data, to output the first information relative to a connection between the vehicle and the or each trailer.

Advantageously, the first machine learning model is one of the following machine learning models: Logistic regression, K-Nearest Neighbours, Support Vector Machines, Decision Tree, Random Forest, Naïve Bayes, Convolutional Neural Network.

The method further comprises applying test 62 on the first information to determine whether the first information indicates that at least one trailer is connected to the vehicle. If the first information indicates no connection (answer "no" to test 62), the method continues with receiving 50 raw signals.

If at least one trailer is connected to the vehicle (answer "yes" to test 62), the method comprises using the time domain signal $X(t)$ and the corresponding frequency domain signal $Y(f)$ as input to a second machine learning model, for applying 64 the second machine learning model to obtain a second information indicating a number of trailers connected to the vehicle and/or using the time domain signal $X(t)$ and the corresponding frequency domain signal $Y(f)$ as input to a third machine learning model, and applying 66 the third machine learning model to obtain a third information indicating, for the or each of the trailers connected to the vehicle, whether the trailer antilock braking system unit is sending a message to the vehicle.

Advantageously, the second machine learning model is one of the following machine learning models: Linear regression, Ridge regression, Neural Network regression, Lasso regression, Decision Tree regression, Random Forest, K-Nearest Neighbours, Support Vector Machines, Gaussian Regression, Polynomial Regression., Convolutional Neural Network.

Advantageously, the third machine learning model is one of the following machine learning models: Logistic regression, K-Nearest Neighbours, Support Vector Machines, Decision Tree, Random Forest, Naïve Bayes, Convolutional Neural Network.

The method further comprises providing 68 the information obtained, i.e. the first information, and/or the second information and/or the third information in the example, to the user interface unit. The information shall then be used to control the user interface to inform the vehicle operator, and to alert the operator if a whether the trailer antilock braking system unit is sending a message, for example in case of malfunction.

According to a variant, the second information and/or the third information is also provided as a feedback to the input of applying 60 the first machine learning model, so as to increase the accuracy of the first machine learning model to obtain a first information indicating, for the or each trailer, whether said trailer is connected or not to the vehicle.

As appears clearly from the description above, the method comprises applying signal processing to a raw signal received, to obtain a time domain signal, and transforming the time domain signal to a frequency domain signal, using the time domain signal and the frequency domain signal in one or more machine learning models, wherein each machine learning model was previously trained to output an information relative to a connection between the vehicle and the or each trailer and providing the information to the user interface unit.

Figure 4:
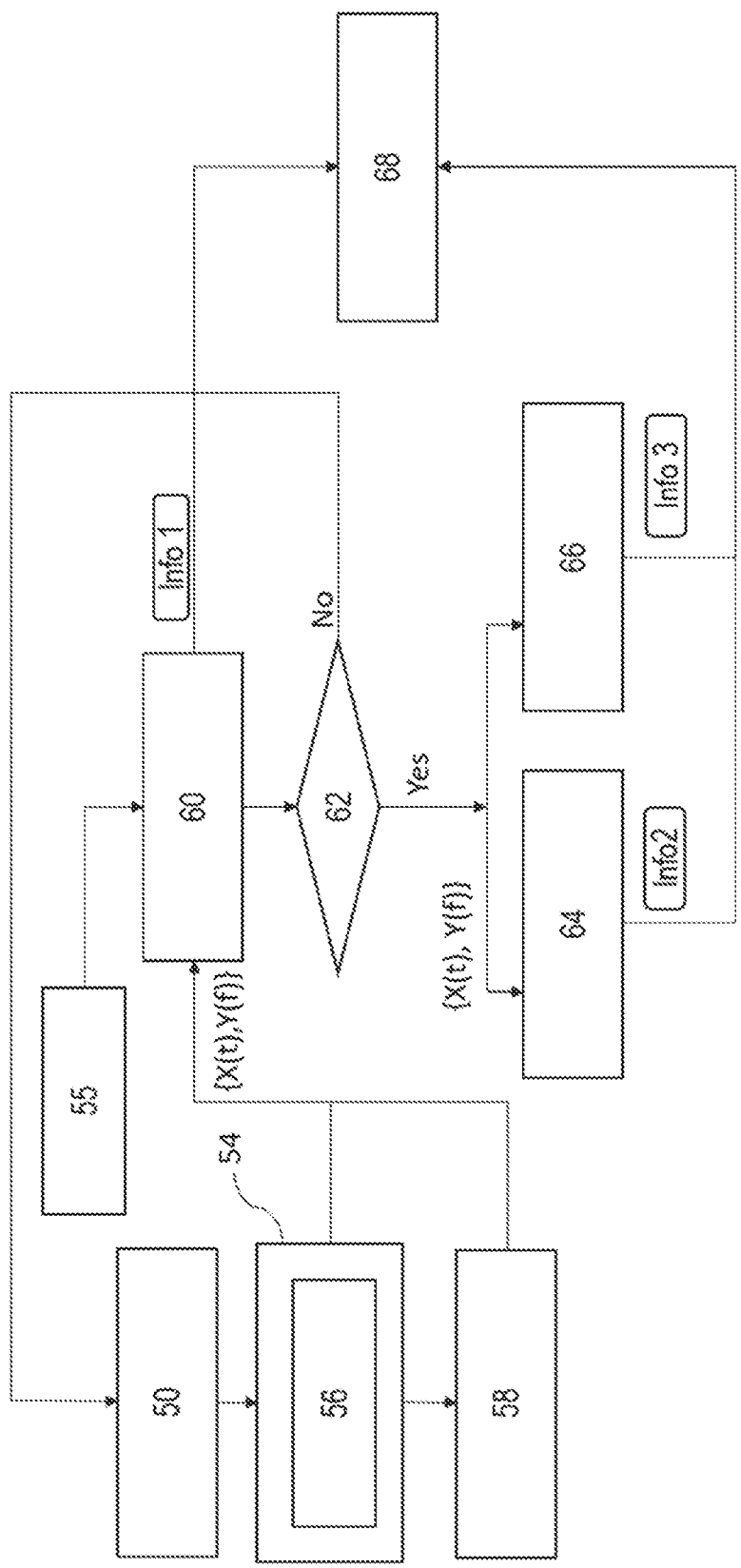
FIG. 4 is an exemplary flowchart of a method for providing information between a vehicle and at least one trailer, according to another example.

FIG. 4 is a flowchart of a method for providing information relative to a connection between a vehicle and at least one trailer according to another example.

In this variant, the vehicle also comprises a hardware chip dedicated to detecting signals transmitted over the power line communication, and the method further comprises receiving 55 an indication of detection of signals transmitted over the power communication line, the indication being provided as another input to the first machine learning model.

Advantageously, the first information obtain may be more accurate thanks to the supplementary indication provided as an input. Furthermore, the existing PLC hardware chip detection is provided so that the machine learning model is trained over time, and can detect accurately the signals transmitted over the power line communication. In other words, the model(s) are trained to predict accurately the PLC detection, and therefore to replace the hardware chip in case the hardware chip is out of order. Additionally, the performance of hardware and signal processing may complement each other by one acting as primary system when the other system has challenging conditions. For example, the hardware chip-based system can be good at certain operational conditions and the signal processing based on AI is efficient at other operational conditions where there is enormous data thereby complementing each other in terms of redundancy to maintain peak performance over wide operational conditions.

Figure 5:
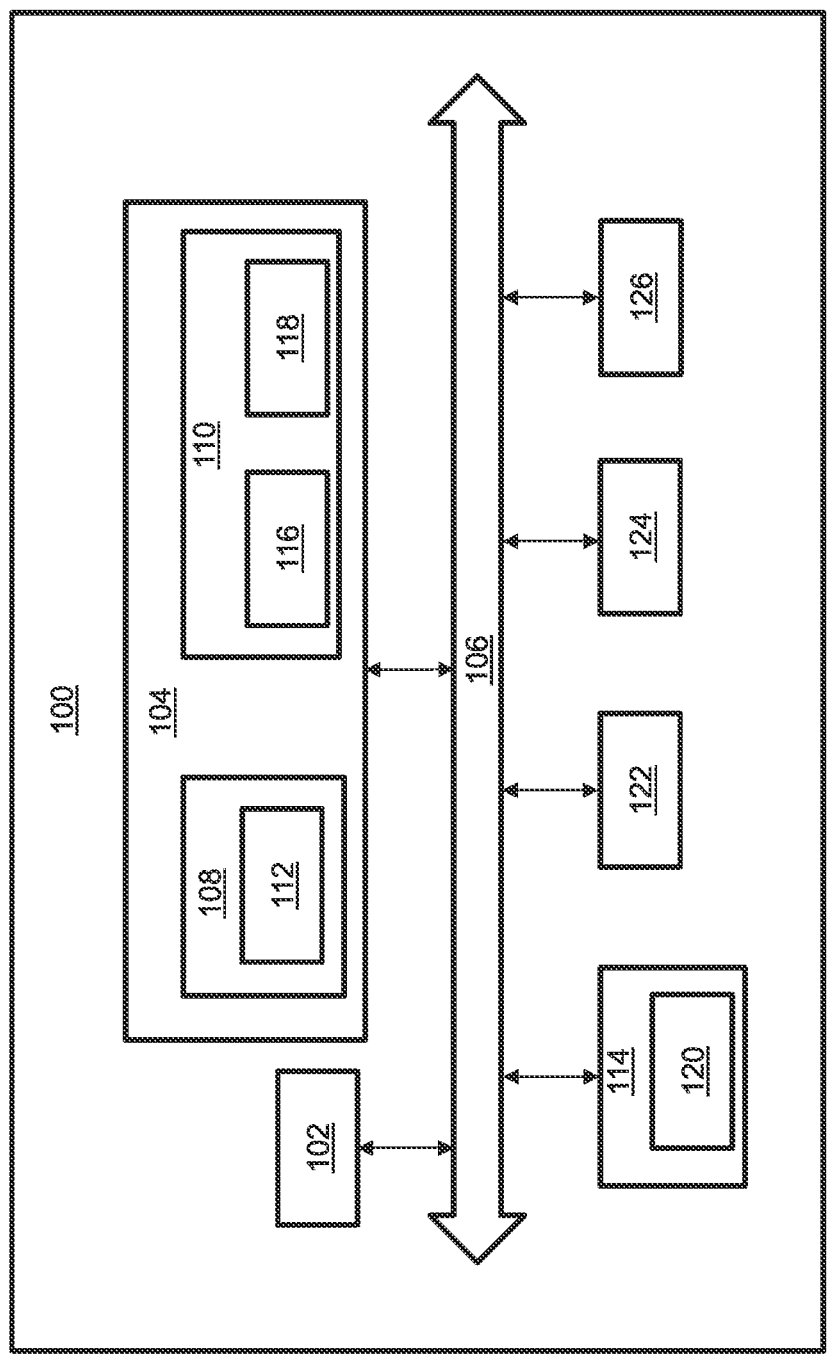
FIG. 5 is a schematic diagram of an exemplary computer system for implementing examples disclosed herein, according to an example.

FIG. 5 is a schematic diagram of an exemplary computer system 100 for implementing examples disclosed herein, according to an example.

The computer system 100 is adapted to execute instructions from a computer-readable medium to perform these and/or any of the functions or processing of the method for providing information relative to a connection between a vehicle and at least one trailer described herein. The computer system 100 may be connected (e.g., networked) to other machines in a LAN, an intranet, an extranet, or the Internet. While only a single device is illustrated, the computer system 100 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 100 may comprise at least one computing device or electronic device capable of including firmware, hardware, and/or executing software instructions to implement the functionality described herein. The computer system 100 may include processing circuitry 102 (e.g., processing circuitry including one or more processor devices or control units), a memory 104, and a system bus 106. The computer system 100 may include at least one computing device having the processing circuitry 102. The system bus 106 provides an interface for system components including, but not limited to, the memory 104 and the processing circuitry 102. The processing circuitry 102 may include any number of hardware components for conducting data or signal processing or for executing computer code stored in memory 104. The processing circuitry 102 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 102 may further include computer executable code that controls operation of the programmable device.

The system bus 106 may be any of several types of bus structures that may further interconnect to a memory bus (with or without a memory controller), a peripheral bus, and/or a local bus using any of a variety of bus architectures. The memory 104 may be one or more devices for storing data and/or computer code for completing or facilitating methods described herein. The memory 104 may include database components, object code components, script components, or other types of information structure for supporting the various activities herein. Any distributed or local memory device may be utilized with the systems and methods of this description. The memory 104 may be communicably connected to the processing circuitry 102 (e.g., via a circuit or any other wired, wireless network connection) and may include computer code for executing one or more processes described herein. The memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)), or any other medium which can be used to carry or store desired program code in the form of machine-executable instructions or data structures and which can be accessed by a computer or other machine with processing circuitry 102. A basic input/output system (BIOS) 112 may be stored in the non-volatile memory 108 and can include the basic routines that help to transfer information between elements within the computer system 100.

The computer system 100 may further include or be coupled to a non-transitory computer-readable storage medium such as the storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 114 and/or in the volatile memory 110, which may include an operating system 116 and/or one or more program modules 118. All or a portion of the examples disclosed herein may be implemented as a computer program 120 stored on a transitory or non-transitory computer-usable or computer-readable storage medium (e.g., single medium or multiple media), such as the storage device 114, which includes complex programming instructions (e.g., complex computer-readable program code) to cause the processing circuitry 102 to carry out: applying signal processing to a raw signal received, to obtain a time domain signal, and transform the time domain signal to a frequency domain signal; use the time domain signal and the frequency domain signal in one or more machine learning models, each machine learning model was previously trained to output an information relative to a connection between the vehicle and the or each trailer; providing the information to the user interface unit. Thus, the computer-readable program code of the computer program 120 can comprise software instructions for implementing the functionality of the examples described herein when executed by the processing circuitry 102. In some examples, the storage device 114 may be a computer program product (e.g., readable storage medium) storing the computer program 120 thereon, where at least a portion of a computer program 120 may be loadable (e.g., into a processor) for implementing the functionality of the examples described herein when executed by the processing circuitry 102. The processing circuitry 102 may serve as a controller or control system for the computer system 100 that is to implement the functionality described herein.

The computer system 100 may include an input device interface 122 configured to receive input and selections to be communicated to the computer system 100 when executing instructions, such as from a keyboard, mouse, touch-sensitive surface, etc. Such input devices may be connected to the processing circuitry 102 through the input device interface 122 coupled to the system bus 106 but can be connected through other interfaces, such as a parallel port, an Institute of Electrical and Electronic Engineers (IEEE) 1394 serial port, a Universal Serial Bus (USB) port, an IR interface, and the like. The computer system 100 may include an output device interface 124 configured to forward output, such as to a display, a video display unit (e.g., a liquid crystal display (LCD) or a cathode ray tube (CRT)). The computer system 100 may include a communications interface 126 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1

A system for providing information relative to a connection between a vehicle and at least one trailer, the system comprising a power line communication configured to communicate raw signals on at least one electric power conductor between the or each trailer and the vehicle, the system further comprising a user interface unit and a processing unit, the processing unit being configured to:
  apply signal processing to a raw signal received, to obtain a time domain signal, and transform the time domain signal to a frequency domain signal,
  use the time domain signal and the frequency domain signal in one or more machine learning models,
  wherein each machine learning model was previously trained to output an information relative to a connection between the vehicle and the or each trailer,
  provide the information to the user interface unit Example 2

The system of example 1, wherein the transform comprises applying a Fourier Transform on the time domain signal to obtain the frequency domain signal.

Example 3

The system of example 1, wherein the transform comprises applying a Welch power spectral density estimation on the time domain signal to obtain the frequency domain signal.

Example 4

The system of any of examples 1 to 3, wherein said information comprises a first information indicating, for the or each trailer, whether said trailer is connected or not to the vehicle.

Example 5

The system of any of examples 1 to 4, wherein said information comprises a second information indicating a number of trailers connected to the vehicle.

Example 6

The system of any of examples 1 to 5, wherein the or each trailer comprises an antilock braking system unit configured to send messages to the vehicle over the power line communication, and wherein said information comprises a third information indicating, for the or each of the trailers connected to the vehicle, whether the trailer antilock braking system unit is sending a message to the vehicle.

Example 7

The system of any of examples 1 to 6, wherein the processing unit is onboard the vehicle;

Example 8

The system of any of examples 1 to 7, wherein the vehicle comprises a wireless communication unit adapted to communicate with a wireless communication unit of a distant server, and wherein said processing unit is on said server.

Example 9

The system of any of examples 1 to 8, wherein said user-interface unit is situated in the vehicle and comprises a display visible by an operator of the vehicle.

Example 10

The system of any of examples 1 to 9, wherein the or each trailer comprises an antilock braking system unit configured to send messages to the vehicle over the power line communication, the system further comprising a hardware chip dedicated to detecting signals transmitted over the power line communication.

Example 11

A method for providing information relative to a connection between a vehicle and at least one trailer, implement on a system comprising a power line communication configured to communicate raw signals on at least one electric power conductor between the or each trailer and the vehicle, the system further comprising a user interface unit and a processing unit, the method being implemented by the processing unit and comprising: applying signal processing to a raw signal received, to obtain a time domain signal, and transforming the time domain signal to a frequency domain signal, using the time domain signal and the frequency domain signal in one or more machine learning models, wherein each machine learning model was previously trained to output an information relative to a connection between the vehicle and the or each trailer, providing the information to the user interface unit.

Example 12

The method of example 11, wherein the transforming of a time domain signal to a frequency domain signal comprises applying a Fourier Transform on the time domain signal to obtain the frequency domain signal.

Example 13

The method of example 11 or 12, wherein the transforming of a time domain signal to a frequency domain signal comprises applying a Welch power spectral density estimation on the time domain signal to obtain the frequency domain signal.

Example 14

The method of any of examples 11 to 13, wherein said information comprises a first information indicating, for the or each trailer, whether said trailer is connected or not to the vehicle.

Example 15

The method of example 14, wherein a first machine learning model is used to obtain said first information, the first machine learning model being comprised in a group comprising {Logistic regression, K-Nearest Neighbours, Support Vector Machines, Decision Tree, Random Forest, Naïve Bayes, Convolutional Neural Network}.

Example 16

The method of any of examples 1 to 15, wherein said information comprises a second information indicating a number of trailers connected to the vehicle.

Example 17

The method of example 16, wherein a second machine learning model is used to obtain said second information, the second machine learning model being comprised in a group comprising {Linear regression, Ridge regression, Neural Network regression, Lasso regression, Decision Tree regression, Random Forest, K-Nearest Neighbours, Support Vector Machines, Gaussian Regression, Polynomial Regression, Convolutional Neural Network}.

Example 18

The method of any of examples 11 to 17, wherein said information comprises a third information indicating, for the or each of the trailers connected to the vehicle, whether a trailer antilock braking system unit is sending a message to the vehicle.

Example 19

The method according to example 18, wherein a third machine learning model is used to obtain said third information, the third machine learning model being comprised in a group comprising {Logistic regression, K-Nearest Neighbours, Support Vector Machines, Decision Tree, Random Forest, Naïve Bayes, Convolutional Neural Network}.

Example 20

A computer program product comprising program code for performing, when executed by the processing circuitry, the method of any of examples 11 to 19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A system for providing information relative to a connection between a vehicle and at least one trailer, the system comprising a power line communication configured to communicate raw signals on at least one electric power conductor between the or each trailer and the vehicle, the system further comprising a user interface unit and a processing unit, the processing unit being configured to:
apply signal processing to a raw signal received, to obtain a time domain signal, and transform the time domain signal to a frequency domain signal;
use both the time domain signal and the frequency domain signal as inputs of one or more machine learning models;
wherein each machine learning model is parameterized with values learned during a training phase to output an information relative to a connection between the vehicle and the or each trailer; and
provide the information to the user interface unit.

2. The system of claim 1, wherein the transform comprises applying a Fourier Transform on the time domain signal to obtain the frequency domain signal.

3. The system of claim 1, wherein the transform comprises applying a Welch power spectral density estimation on the time domain signal to obtain the frequency domain signal.

4. The system of claim 1, wherein the information comprises a first information indicating, for the or each trailer, whether the trailer is connected or not to the vehicle.

5. The system of claim 1, wherein the information comprises a second information indicating a number of trailers connected to the vehicle.

6. The system of claim 1, wherein the or each trailer comprises an antilock braking system unit configured to send messages to the vehicle over the power line communication, and wherein the information comprises a third information indicating, for the or each of the trailers connected to the vehicle, whether the trailer antilock braking system unit is sending a message to the vehicle.

7. The system of claim 1, wherein the processing unit is onboard the vehicle.

8. The system of claim 1, wherein the vehicle comprises a wireless communication unit adapted to communicate with a wireless communication unit of a distant server, and wherein the processing unit is on the server.

9. The system of claim 1, wherein the user-interface unit is situated in the vehicle and comprises a display visible by an operator of the vehicle.

10. The system of claim 1, wherein the or each trailer comprises an antilock braking system unit configured to send messages to the vehicle over the power line communication, the system further comprising a hardware chip dedicated to detecting signals transmitted over the power line communication.

11. A method for providing information relative to a connection between a vehicle and at least one trailer, implemented on a system comprising a power line communication configured to communicate raw signals on at least one electric power conductor between the or each trailer and the vehicle, the system further comprising a user interface unit and a processing unit, the method being implemented by the processing unit and comprising:
applying signal processing to a raw signal received, to obtain a time domain signal, and transforming the time domain signal to a frequency domain signal;
using both the time domain signal and the frequency domain signal as inputs of one or more machine learning models, wherein each machine learning model is parameterized with values learned during a training phase to output an information relative to a connection between the vehicle and the or each trailer; and
providing the information to the user interface unit.

12. The method of claim 11, wherein the transforming of a time domain signal to a frequency domain signal comprises applying a Fourier Transform on the time domain signal to obtain the frequency domain signal.

13. The method of claim 11, wherein the transforming of a time domain signal to a frequency domain signal comprises applying a Welch power spectral density estimation on the time domain signal to obtain the frequency domain signal.

14. The method of claim 11, wherein the information comprises a first information indicating, for the or each trailer, whether the trailer is connected to the vehicle or not.

15. The method of claim 14, wherein a first machine learning model is used to obtain the first information, the first machine learning model being comprised in a group comprising: Logistic regression, K-Nearest Neighbours, Support Vector Machines, Decision Tree, Random Forest, Naïve Bayes, Convolutional Neural Network.

16. The method of claim 11, wherein the information comprises a second information indicating a number of trailers connected to the vehicle.

17. The method of claim 16, wherein a second machine learning model is used to obtain the second information, the second machine learning model being comprised in a group comprising: Linear regression, Ridge regression, Neural Network regression, Lasso regression, Decision Tree regression, Random Forest, K-Nearest Neighbours, Support Vector Machines, Gaussian Regression, Polynomial Regression, Convolutional Neural Network.

18. The method of claim 11, wherein the information comprises a third information indicating, for the or each of the trailers connected to the vehicle, whether a trailer antilock braking system unit is sending a message to the vehicle.

19. The method of claim 18, wherein a third machine learning model is used to obtain the third information, the third machine learning model being comprised in a group comprising: Logistic regression, K-Nearest Neighbours, Support Vector Machines, Decision Tree, Random Forest, Naïve Bayes, Convolutional Neural Network.

20. A non-transitory storage medium comprising instructions, which when executed by the processing circuitry, cause the processing circuitry to perform providing information relative to a connection between a vehicle and at least one trailer, on a system comprising a power line communication configured to communicate raw signals on at least one electric power conductor between the or each trailer and the vehicle, the system further comprising a user interface unit and a processing unit, comprising:
    applying signal processing to a raw signal received, to obtain a time domain signal, and transforming the time domain signal to a frequency domain signal;
    using both the time domain signal and the frequency domain signal as inputs of one or more machine learning models, wherein each machine learning model is parameterized with values learned during a training phase to output an information relative to a connection between the vehicle and the or each trailer; and
    providing the information to the user interface unit.

* * * * *